United States Patent
Harrington (10) Patent No.: US 11,606,674 B2
(45) Date of Patent: Mar. 14, 2023

(54) NETWORK BASED CONTAINERIZED COMPUTING

(71) Applicant: T-Mobile USA, Inc., Bellevue, WA (US)

(72) Inventor: Richard Alexander Harrington, Bellevue, WA (US)

(73) Assignee: T-Mobile USA, Inc., Bellevue, WA (US)

(*) Notice: Subject to any disclaimer, the term of this patent is extended or adjusted under 35 U.S.C. 154(b) by 110 days.

(21) Appl. No.: 17/137,058

(22) Filed: Dec. 29, 2020

(65) Prior Publication Data

US 2022/0210619 A1    Jun. 30, 2022

(51) Int. Cl.
*H04W 4/20*     (2018.01)
*H04W 64/00*    (2009.01)
*G06F 9/455*    (2018.01)
*H04L 61/4511*  (2022.01)

(52) U.S. Cl.
CPC .......... *H04W 4/20* (2013.01); *G06F 9/45558* (2013.01); *H04L 61/4511* (2022.05); *H04W 64/00* (2013.01); *G06F 2009/45587* (2013.01)

(58) Field of Classification Search
CPC ....... G06F 9/45558; G06F 2009/45587; H04L 61/4511; H04W 64/00
See application file for complete search history.

(56) References Cited

U.S. PATENT DOCUMENTS

2020/0401452 A1* 12/2020 Piercey ............... G06F 9/5016
2021/0136178 A1*  5/2021 Casey .................. H04L 61/50

FOREIGN PATENT DOCUMENTS

WO    WO-2022067829 A1 *  4/2022

* cited by examiner

*Primary Examiner* — Elton Williams
(74) *Attorney, Agent, or Firm* — Lee & Hayes, P.C.

(57) ABSTRACT

Techniques for instantiating containers in a network are discussed herein. A container controller component can receive a request from a user equipment (UE) for a service, whereby a portion of the service is performed by a containerized application. The container controller component can determine a location of the UE and can determine a number of requests for the service associated with that location. If the number of requests meet or exceed a threshold number, and/or if one or more metrics associated with the service are indicative of a quality level below a threshold, the container controller component can instantiate a container associated with the service at a computing device associated with the location. In some examples, the container can run an application, such as a presentation layer of the service, which can respond to the request from the UE.

16 Claims, 5 Drawing Sheets

NETWORK BASED CONTAINERIZED COMPUTING

BACKGROUND

Many entities and organizations, including operators of wireless communication networks, deploy large numbers of applications (apps) in containers to provide services to users. Indeed, the deployment of apps has grown exponentially to tens, even hundreds, of thousands of containers. Such containers may be executed geographically all over the world. As is known, for general cloud architecture, containers are generally executed in application pods and may also be referred to application containers or software service containers.

A set of containers can be managed by a container manager, such as a container orchestrator. Containers can be associated with dedicated computing resources, and instances of network applications can execute inside containers using the dedicated computing resources associated with the containers.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Techniques for instantiating containers in a network are discussed herein. For example, a container controller component can receive a request from a user equipment for a service. The service can be associated with a presentation layer, an orchestration layer, and/or a backend or database layer. In some examples, the presentation layer can be instantiated as a containerized application. The container controller component can determine a location of the UE and can determine a number of requests for the service associated with that location. If the number of requests meet or exceed a threshold number, and/or if one or more metrics associated with the service are indicative of a quality level below a threshold, the container controller component can instantiate a container associated with the service at a computing device associated with the location. In some examples, the container can run an application, such as the presentation layer of the service, which can respond to the request from the UE.

In this manner, the container controller component can analyze requests received from UEs in a network and can instantiate containers comprising applications such as presentation layer, orchestration layers, or the like, at or near locations where demand is greatest and/or where network performance or a quality metric is low. In some examples, the container controller component can instantiate the containers at computing devices associated with base stations or other network computing devices.

Because the techniques discussed herein can be implemented in the context of a communication network, the container controller component may have visibility into key network metrics such as bandwidth restrictions or availability, latency, UE location(s) in a network, subscriber information, service types, UE capabilities, radio access technologies, and the like. Accordingly, the container controller component can leverage the many computing devices associated with a network to most efficiently provide services to UEs throughout the network.

By way of example and without limitation, the container controller component can determine a location of a UE in the network based on a location of a base station associated with a connection of a user, a round trip time, latency, ping, location data such as GPS, timing advance data, and the like. In some examples, the container controller component can instantiate container(s) associated with services at locations hosting other containerized applications of a 5G network. In some examples, the container controller can query other components of the network (e.g., a 4G or 5G network) to determine where to most efficiently locate a container for the UEs in a network.

By way of another example, the container controller component may be implemented in connection with a Domain Name System (DNS) Server associated with a telecommunications network. The DNS server may receive request(s) from UEs and may route requests to closest a container associated with requests. If a number of requests (e.g., from a particular location) meets or exceeds a threshold (within a period of time), or if one or more performance metrics indicate that a quality is below a threshold, the container controller component can instantiate another container at a computing device closer to the source of the requests in the network and/or at a computing device that has resources to better serve the requests. The container controller component can update an Internet Protocol (IP) address at the DNS server to route requests from a specific base station, for example, to the newly instantiated containerized application(s).

In one example, containers can instantiate application(s) associated with presenting user interfaces on a UE, such as in connection with account management application, video streaming applications, and the like. For example, when a user is accessing their user account (or other function(s) associated with a service), the user may send a request from a UE to the presentation layer. The presentation layer can generate, render, and/or deliver content to be presented on the UE. In some examples, the presentation layer can transmit request(s) to an orchestration layer, which may respond to request(s) and/or request data from and/or write data to a database layer. In general, the presentation layer may communicate with the orchestration layer, while in some examples, presentation layer may transmit and/or receive information to and from the database layer directly. Of course, this is one example of a containerized architecture, and other implementations are contemplated.

In general, each container can be a virtual and/or isolated computing environment that has dedicated computing resources, such that problems with one container or an instance of a network application running in that container are unlikely to cause problems with other containers or instances of network applications running in the other containers. Containers can be similar to virtual machines, but may have a smaller footprint than virtual machines. For example, while multiple virtual machines may run on a computing device, generally each virtual machine has its own operating system. In contrast, multiple containers running on a computing device may share an operating system of the computing device, but have other dedicated computing resources specific to each container.

In some examples, a container can be implemented as a Kubernetes container.

The containerized applications can be implemented in the context of a dual connectivity environment comprising an eNodeB (e.g., a 4G base station) and a gNodeB (e.g., a 5G base station). In some examples, when a UE is connected to a 4G and a 5G base station via a dual connection, the container controller component can instantiate a container with an application at a base station anchoring the dual connectivity. For example, in the case that a dual connectivity connection is anchored via a 5G base station, the container may be instantiated at the 5G base station or at a computing device associated with the 5G base station. In the case that a dual connectivity connection is anchored via a 4G base station, the container may be instantiated at the 4G base station or at a computing device associated with the 4G base station. Further, in some examples, a container can be instantiated at a computing device associated with the base station that will provide the data in response to a request. For example, a request for a service includes providing a particular data type, and if that particular data type is prioritized or routed through a particular base station, a container may be instantiated at the base station providing the data to the UE or at a computing device associated with the base station, to minimize latency.

In some examples, the container controller component can instantiate containers and applications at edges of a network to reduce latency and to reduce signaling in the network. For example, content associated with particular physical locations (e.g., augmented reality application) may be associated with computing resources closest to anticipated or actual demands. Further, instantiating containers throughout edges of a network provides for redundant computing resources that can quickly balance loads across the network. The containerized applications can improve efficiency and may facilitate maintenance of applications and of computing devices in a network. These and other improvements to the functioning of a computing device and/or network are discussed throughout this disclosure.

In some examples, the techniques discussed herein can be implemented in the context of protocols associated with one or more of 3G, 4G, 4G LTE, 5G protocols. In some examples, the network implementations can support standalone architectures, non-standalone architectures, dual connectivity, carrier aggregation, etc.

Example implementations are provided below with reference to the following figures.

Figure 1:
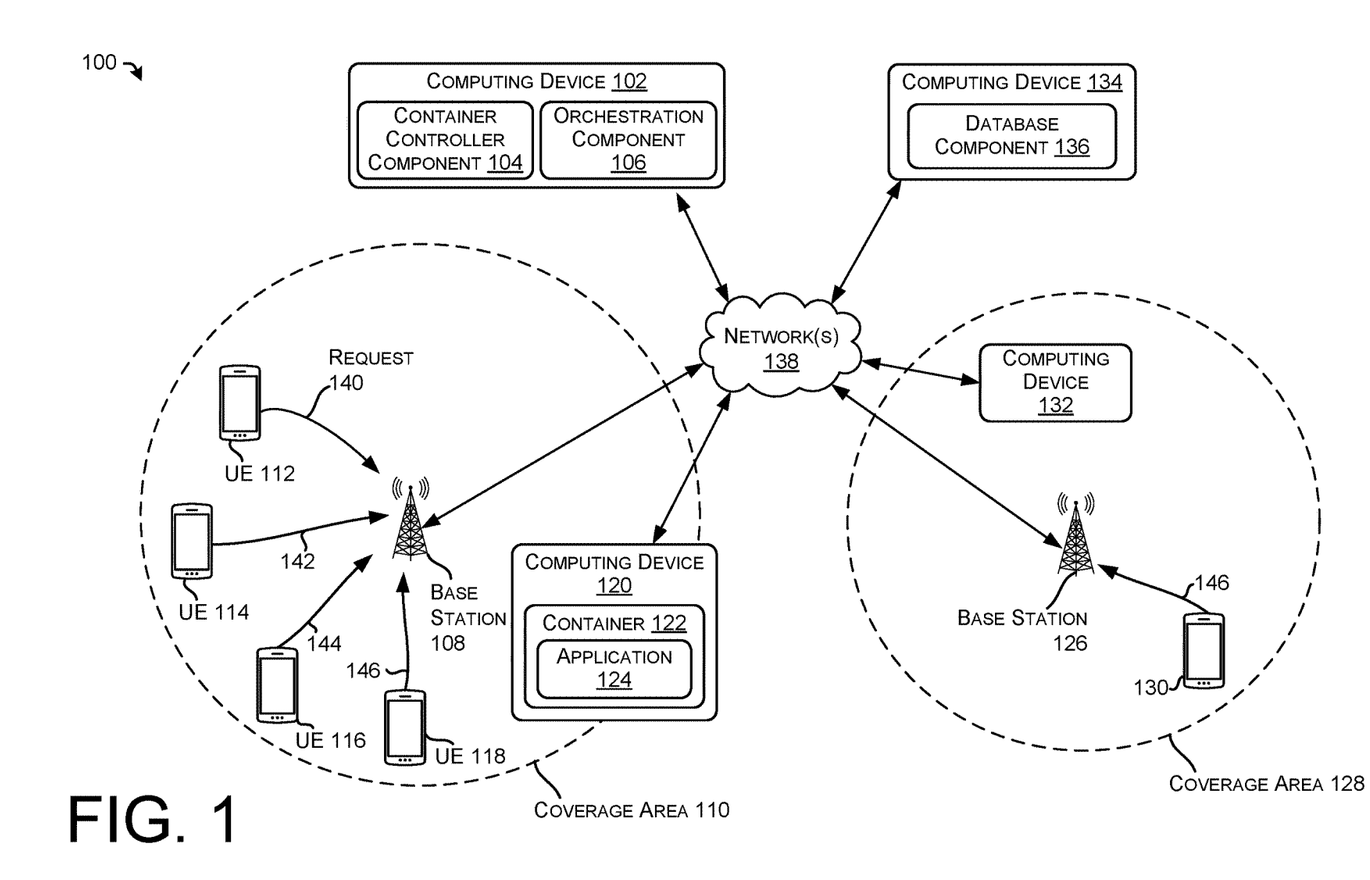
FIG. 1 shows an example of a telecommunication network including instances of network applications within containers managed by a container controller component.

FIG. 1 shows an example of a telecommunication network 100 including instances of network applications within containers managed by a container controller component.

The network 100 may include a computing device 102 comprising a container controller component 104 and an orchestration component 106. In general, the container controller component 104 can receive requests for services, route requests to a container associated with a location of the request, and/or instantiate new containers based on request(s) or performance metrics associated with such request(s). In general, the orchestration component 106 can receive request(s) from a presentation layer (e.g., an application, discussed below), and can request data from and/or write data to a backend component (e.g., a database component, discussed below).

The network 100 may further include a base station 108 with a coverage area 110. Various user equipments (UEs) 112, 114, 116, and 118 may be within the coverage area 110 and may be communicating with or may otherwise be connected to the base station 108. UEs 112, 114, 116, and/or 118 can connect to a telecommunication network to engage in communication sessions for voice calls, video calls, messaging, data transfers, and/or any other type of communication.

The UEs can be any device that can wirelessly connect to the telecommunication network. In some examples, a UE can be a mobile phone, such as a smart phone or other cellular phone. In other examples, the UE can be a personal digital assistant (PDA), a media player, a tablet computer, a gaming device, a smart watch, a hotspot, a personal computer (PC) such as a laptop, desktop, or workstation, or any other type of computing or communication device.

In general, a UE can wirelessly connect to one or more base stations or other access points of the access networks, and in turn be connected to a core network or other computing devices via the base stations or other access points. In some examples, a core network can be a packet core network of an LTE network, which may be referred to as an Evolved Packet Core (EPC). In other examples, a core network can be a 5G core network.

The network 100 further includes a computing device 120 comprising a container 122 running an application 124. The computing device 120 can be associated with the base station 108. For example, the computing device 120 can be physically collocated with the base station 108 and/or may provide computing resources to the base station 108. That is, although illustrated as a separate computing device, the computing device 120 may correspond to the base station 108. In some examples, the computing device 120 may be associated with the base station 108 based on a relative latency, bandwidth, processing power, and the like, with respect to other computing devices.

In some examples, the application 124 can represent a presentation layer associated with presenting content on a user interface (e.g., a display) associated with a UE. For examples, the application 124 can render content based on a type of the UE (e.g., desktop, set-top box, smartphone, etc.). The application 124 can generate HTML, JavaScript, etc., to render content on the user interface associated with a UE. For example, the application 124 can present interactive webpages, user profile information, advertisements based on user characteristics, streaming content based on user information, and the like. As noted above, the application 124 can transmit data to and from the orchestration component 106 or a database component.

The network 100 may further include a base station 126 with an associated coverage area 128. A UE 130 may be within the coverage area 128 and may be in communication with the base station 126. A computing device 132 may be associated with the base station 126. For example, the computing device 132 can be physically collocated with the base station 126 and/or may provide computing resources to the base station 126. In some examples, the computing device 132 may be associated with the base station 126 based on a relative latency, bandwidth, processing power, and the like, with respect to other computing devices.

The network 100 may further include a computing device 134 comprising a database component 136. The database component 136 may store data and may provide data to various components based on requests from such components. For example, the database component can transmit data to the orchestration component 106 and/or to the application 124. Further, the database component 136 can store data received from devices as well.

The various components of the network 100 (e.g., the computing devices 102, 120, 132, and 134, the base stations 108 and 126, etc.) may be communicatively coupled via one or more network(s) 138.

In some examples, the one or more network(s) 138 can comprise a first network owned and/or controlled by a service provider associated with the base stations 108 and/or 128 and a second network such as the Internet.

As illustrated, the base station 108 can receive a request 140 for a service from the UE 112. In some examples, the base station 108 can send the request 140 to the computing device 102 for the request to be routed to an appropriate container that can respond to the request. In some examples, the container controller component 104 can route the request 140 to the application 124 operating within the container 122.

In some examples, the container controller component 104 can instantiate the container 122 based on receiving a number of requests for the service above (e.g., meeting or exceeding) a threshold number of requests. Because the computing device 120 is associated with the base station 108, when requests are received at the base station 108, the container controller component 104 can instantiate the container 122 at the computing device 120. For example, the container controller component 104 can receive requests 142, 144, and 146 (in addition to the request 140) and can instantiate the container 122 on the basis of those requests. The container 122 responds to the requests 140, 142, 144, and 146, respectively, with a lower latency than if the container were instantiated in the computing device 132, for example.

In other examples, the application 124 may be configured with content that is particularly relevant to UEs associated with the base station 108. For example, the application 124 may be configured with site-specific augmented reality information, or, in an example where the base station 108 is associated with a sports stadium, the application 124 may be configured with sports related information such as instant replays, team information, and the like. In some examples, the techniques can include instantiating a distributed cache in one or more computing devices associated with the network 100. In some examples, a distributed cache can store data specific to a location, such as augmented reality and/or virtual reality data, as discussed herein, although any type of data can be stored in a containerized storage. As requests for data are received, data can be cached at particular containers to reduce the number of round-trip requests to the backend systems. In some examples, a distributed cache and/or a containerized application may implement encryption and/or security protocols to protect sensitive information, such as personally identifiable information (PII). Of course, these are examples and other types of content are contemplated as being within the scope of this disclosure.

The UE 130 may send a request 146 for a service, which may be received by the container controller component 104. The container controller component 104 can route the request 146 to the container 122 executing the application 124 for the application 124 to respond to the request 146. Because the number of requests associated with the base station 126 may be below a threshold, the container controller component 104 can route the request 146 to the container 122 rather than instantiating another container at the computing device 132, for example. However, if a performance of the container 122 or a quality level is below a threshold, with respect to the UE 130, the container controller component 104 may instantiate a new container at the computing device 132 and can route subsequent requests associated with the base station 126 to another containerized application.

For example, a latency of the request 146 may be above a threshold, in which case the container controller component 104 may instantiate a container at the computing device 132. Such a new container may be instantiated even if a threshold number of requests from the base station 126 are not received within a threshold period of time.

By way of another example, various requests may be associated with a subscriber level such that if a number of requests associated with a first subscriber level is above a threshold, the container controller component 104 may instantiate a container at a location associated with the requests. In such an example, the number of requests associated with the first subscriber level may be less that another threshold associated with subscribers in general.

Figure 2:
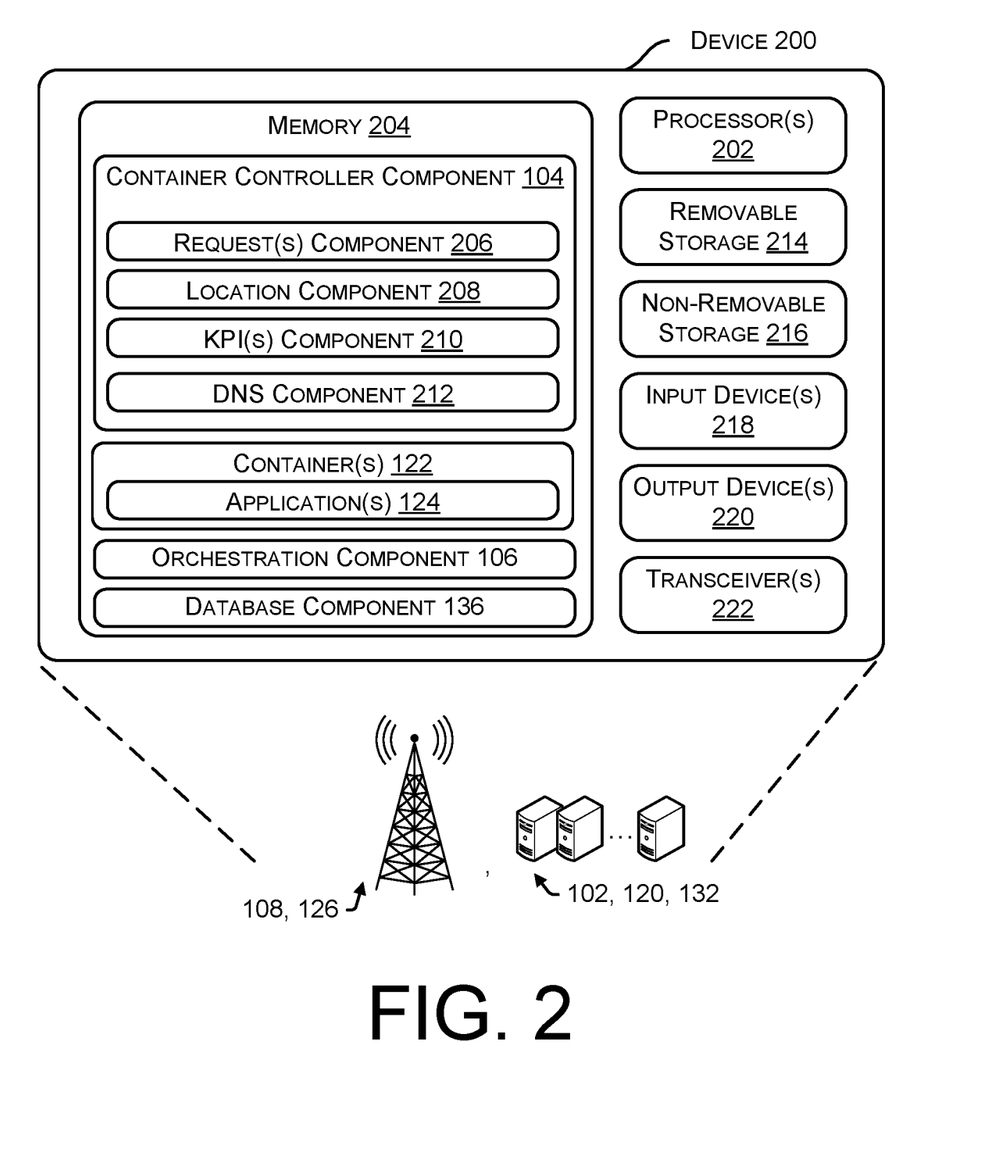
FIG. 2 is a block diagram of a device including a container controller component.

FIG. 2 is a block diagram of a device 200 including a container controller component 104. In some examples, the device 200 can be configured to implement the techniques discussed herein.

FIG. 2 shows only basic, high-level components of the device 200. Generally, the device 200 may comprise and/or may be implemented in any of various network components discussed herein, including those components illustrated in FIG. 1. For example, the device 200 may be implemented in the base station 108 and/or 126, which may include an eNB, a gNB, the computing devices 102, 120, and/or 132, a core network (e.g., a 4G core network and/or a 5G core network), or other network device.

In various examples, the device 200 may include processor(s) 202 and memory 204. Depending on the exact configuration and type of computing device, the memory 204 may be volatile (such as RAM), non-volatile (such as ROM, flash memory, etc.) or some combination of the two. The memory 204 may include the container controller component 104, which may include a request(s) component 206, a location component 208, a KPI(s) component 210, and/or a DNS component 212, the container(s) 122 comprising the application(s) 124, the orchestration component 106, and the database component 136.

In some examples, the container controller component 104 can include functionality to receive requests for services, route requests to a container associated with a location of the request, and/or instantiate new containers based on request(s) or performance metrics associated with such request(s). In some examples, aspects of the container controller component 104 can be implemented as one or more machine learned models or heuristics that can be used to determine when to instantiate containers at various locations in a network. For example, a machine learned model associated with the container controller component 104 can include weight(s) for various factors that can be used to set threshold(s) or likelihoods and/or determine factors that increase or decrease threshold(s) or likelihoods, and by how much.

In some examples, a machine learned model can determine when to instantiate container(s) based on requests, metrics (e.g., UE key performance indicators (KPIs), network KPIs, etc.), subscriber levels, and/or other data as discussed herein. For example, a machine learned model can determine when to instantiate a container and a confidence level associated with a predicted outcome being above a threshold level (e.g., such that there is a likelihood above a threshold level that instantiating a new container will improve a response to a request for a service without reducing other aspects of the performance of the network, etc.).

In some examples, a machine learned model associated with the container controller component 104 can include, but is not limited to, one or more of: neural network(s), convolutional neural network(s), recurrent neural network(s), linear regression algorithm(s), logistic regression algorithm(s), classification and regression tree algorithm(s), Naïve Bayes algorithm(s), K-nearest neighbors algorithm(s), learning vector quantization algorithm(s), support vector machine(s), bagging and random forest algorithm(s), boosting and Adaboost algorithm(s), and the like.

In some examples, the request(s) component 206 can include functionality to receive request(s) from UE(s) and to track such request(s) over time. The request(s) component 206 can associated requests from various base stations or regions with a location identifier. The component 206 can determine a number of requests for a service received within a threshold period of time, and can provide an indication (or otherwise determine) to instantiate a container based on the requests.

In some examples, the location component 208 can include functionality to determine a location associated with a request. The location component 208 can track location(s) based on varying levels of granularity. For example, the location component 208 can determine a location based on a base station receiving a request or can determine a location based on a location of a UE with a coverage area associated with a base station. In some examples, locations can be based on physical locations of base stations or computing resources or based on logical locations of such resources (e.g., based on round trip time to a computing device). In some examples, a coarse location relative to other computing devices in a network may be referred to as a network location.

In some examples, the KPI(s) component 210 can include functionality to track or otherwise determine key performance indicators (KPIs) associated with various requests and instances of containers responding to such requests. For example, the KPIs can include, but are not limited to, a location of container instances, processing resources associated with such containers, statistics associated with requests (e.g., latency, frequency, bandwidth capabilities associated with base stations associated with such requests), load levels at base stations, Channel Quality Information (CQI) data, signal-to-noise ratio (SNR) data, signal-to-interference plus noise ratio (SINR) data, signal-to-noise plus distortion ratio (SNDR) data, and the like. In some examples, the KPIs can be used alone or in connection with other metrics to determine when and where to instantiate containers to respond to requests in a network.

In some examples, the DNS component 212 can include functionality to receive request(s) from UEs and can provide IP address(es) to a requesting UE to access a closest or best-performing container associated with the request. In some examples, the DNS may include functionality to route requests based on a location of such requests to optimize traffic in a network. The DNS component 212 can update IP addresses as containers are instantiated and removed at various locations in a network.

In some examples, the container(s) 122 can be a virtual and/or isolated computing environment that has dedicated computing resources. Containers can be similar to virtual machines, but may have a smaller footprint than virtual machines. For example, while multiple virtual machines may run on a computing device, generally each virtual machine has its own operating system. In contrast, multiple containers running on a computing device may share an operating system of the computing device, but have other dedicated computing resources specific to each container. In some examples, the container(s) can be implemented as Kubernetes container(s).

In some examples, the application(s) 124 can be include application(s) associated with presenting user interfaces on a UE, such as in connection with account management application, video streaming applications, and the like. For example, when a user is accessing their user account (or other function associated with a service), the user may send a request from their UE to the presentation layer. The presentation layer can generate, render, and/or deliver content to be presented on the UE. In some examples, the presentation layer can transmit request(s) to an orchestration layer, which may respond to request(s) and/or request data from and/or write data to a database layer. In general, the presentation layer may communicate with the orchestration layer, while in some examples, presentation layer may transmit and/or receive information to the database layer directly. Of course, this is one example of a containerized architecture, and other implementations are contemplated.

In some examples, the orchestration component 106 can include functionality to receive request(s) from a presentation layer (e.g., implemented as the application(s) 124) and can request data from and/or write data to the database component 136. In some examples, the orchestration component 106 can be a regional component interfacing with any number of container(s) and/or database component(s).

In some examples, the database component 136 can include functionality to store data or other content and provide content in response to requests. In some examples, the database component 136 can respond to read requests from the orchestration component 106 and/or the application(s) 124, while the application(s) may be prevented to writing directly to the database component 136, although other implementations are considered herein.

In some examples, the processor(s) 202 is a central processing unit (CPU), a graphics processing unit (GPU), both CPU and GPU, or other processing unit or component known in the art. Furthermore, the processor(s) 202 may include any number of processors and/or processing cores. The processor(s) 202 is configured to retrieve and execute instructions from the memory 204.

The memory 204 can also be described as non-transitory computer-readable media or machine-readable storage memory, and may include removable and non-removable media implemented in any method or technology for storage of information, such as computer executable instructions, data structures, program modules, or other data.

The memory 204 may include, but is not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other tangible, physical medium which can be used to store the desired information.

The device 200 also includes additional data storage devices (removable and/or non-removable) such as, for example, magnetic disks, optical disks, or tape. Such additional storage is illustrated in FIG. 2 by removable storage 214 and non-removable storage 216. Tangible computer-readable media can include volatile and non-volatile, removable and non-removable media implemented in any method or technology for storage of information, such as computer readable instructions, data structures, program modules, or other data. The memory 204, the removable storage 214 and the non-removable storage 216 are all examples of computer-readable storage media. Computer-readable storage media include, but are not limited to, RAM, ROM, EEPROM, flash memory or other memory technology, CD-ROM, digital versatile discs (DVD), content-addressable memory (CAM), or other optical storage, magnetic cassettes, magnetic tape, magnetic disk storage or other magnetic storage devices, or any other medium which can be used to store the desired information and which can be accessed by the device 200. Any such tangible computer-readable media can be part of the device 200.

The memory 204, the removable storage 214, and/or the non-removable storage 216 may in some cases include storage media used to transfer or distribute instructions, applications, and/or data. In some cases, the memory 204, the removable storage 214, and/or the non-removable storage 216 may include data storage that is accessed remotely, such as network-attached storage that the device 200 accesses over some type of data communications network.

In various examples, any or all of the memory 204, the removable storage 214, and/or the non-removable storage 216 may store programming instructions that, when executed, implement some or all of the function functionality described herein.

The device 200 also can include input device(s) 218, such as a keypad, a cursor control, a touch-sensitive display, voice input device, etc., and output device(s) 220 such as a display, speakers, printers, etc. These devices are well known in the art and need not be discussed at length here.

As illustrated in FIG. 2, the device 200 also includes one or more wired or wireless transceiver(s) 222. For example, the transceiver(s) 222 can include a network interface card (NIC), a network adapter, a LAN adapter, or a physical, virtual, or logical address to connect to various networks, devices, or components illustrated in figures herein. To increase throughput when exchanging wireless data, the transceiver(s) 222 can utilize multiple-input/multiple-output (MIMO) technology. The transceiver(s) 222 can comprise any sort of wireless transceivers capable of engaging in wireless, radio frequency (RF) communication. The transceiver(s) 222 can also include other wireless modems, such as a modem for engaging in Wi-Fi, WiMAX, Bluetooth, infrared communication, and the like.

In some examples, the device 200 can be implemented as a UE, as a computing device, as software, as a containerized application, and the like. Further, aspects of the device 200 can be implemented in a single device or across multiple devices in any combination.

Figure 3:
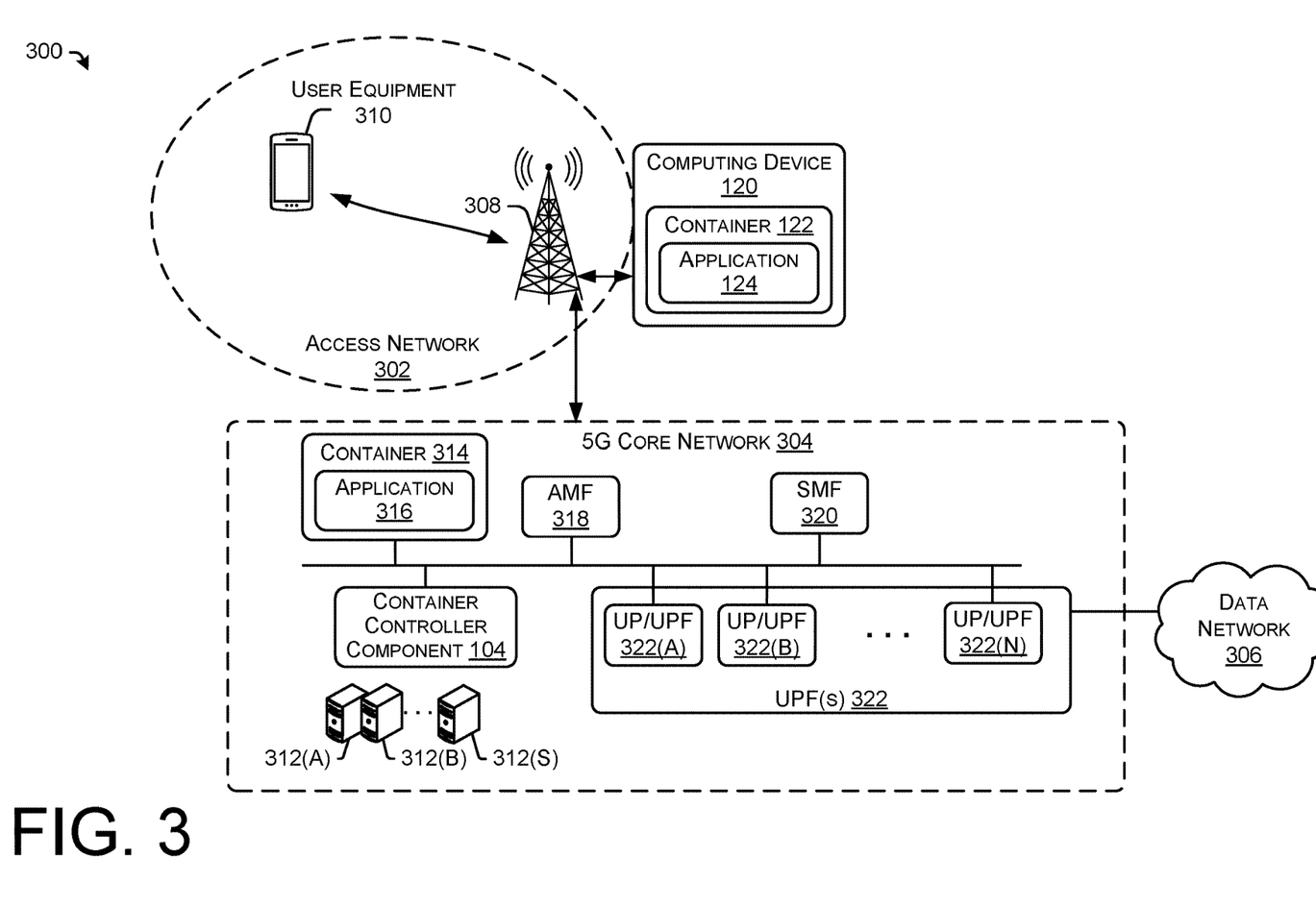
FIG. 3 depicts an example system architecture for a fifth generation (5G) telecommunication network including containerized applications.

FIG. 3 depicts an example system architecture for a fifth generation (5G) telecommunication network including containerized applications. In particular, FIG. 3 depicts how location information associated with requests can be determined such that containers can be instantiated in computing devices associated with the telecommunication network. The environment 300 may include an access network 302, a 5G core network 304, and a data network 306 that is associated with a wireless service provider(s). The environment 300 is illustrated in simplified form and may include many more components.

The environment 300 may include base stations, such as a base station 308, that may be wireless or wired that are coupled to 5G core network 304 and/or some other network. The environment 300 may also include one or more access points (not shown), and one or more gateways (not shown). The base station 308 may handle traffic and signals between electronic devices, such as the user equipment 310, and 5G CN 304. For example, the base station 308 may perform the transcoding of speech channels, allocation of radio channels to electronic devices, paging, transmission and reception of voice and data, as well as other functions. In some examples, the base station 308 may include a gNodeB and/or an eNodeB.

A computing device, such as the computing device 120, may comprise the container 122 running an application 124 to respond to requests directed to a service, as discussed herein.

In some configurations, one or more nodes, such as nodes 312 illustrated in 5G CN 304 may be configured as one or more application servers that provide support for one more containers and/or applications, such as the container 122 or 114 and/or the applications 124 or 316. Some example applications include, but are not limited to browser applications, messaging applications, voice applications (e.g., Voice over Internet Protocol "VoIP" applications), video applications, presentation layer applications, and the like.

While the nodes 312 are illustrated within the 5G CN 304, one or more other computing devices may be located outside of these networks. For example, an application server, or some other server or device, may be connected to a network via one or more external packet switched networks, such as the Internet.

When a communication request arrives at the network 304, one or more of the nodes 312 may determine the identity of the originating computing device for the communication (e.g., using a telephone number, IMEI, IMSI, IP address, location data, etc.) as well as the identity of the computing devices to send the communication. In some configurations, one or more of the nodes 312 may be used to determine the identity of the originating computing device for the communication as well as the identity of the computing devices to send the communication. According to some configurations, a UE 310 may connect to the service nodes 312, or some other component such as an application server, via the Internet (not illustrated).

As illustrated, the environment 300 includes one or more servers, including nodes 312, to facilitate communications by and between the various devices in the environment 300 and perform operations relating to using the data network 306, and/or other networks. That is, the environment 300 can include any computing devices implementing various aspects of one or more of second, third, fourth generation, and fifth generation (2G, 3G, 4G, and 5G) cellular-wireless access technologies, which may be cross-compatible and may operate collectively to provide data communication services.

The environment 300 may include, but is not limited to, a combination of: base transceiver stations BTSs (e.g., NodeBs, Enhanced-NodeBs, gNodeBs), Radio network Controllers (RNCs), serving GPRS support nodes (SGSNs), gateway GPRS support nodes (GGSNs), proxies, a mobile switching center (MSC), a mobility management entity (MME), a serving gateway (SGW), a packet data network (PDN) gateway (PGW), an evolved packet data gateway (e-PDG), an Internet Protocol (IP) Multimedia Subsystem (IMS), or any other data traffic control entity configured to communicate and/or route data packets between the UE 310, and one or more endpoints within the environment 300 (e.g., nodes 312A-312S that provide user plane nodes, AMF (Access and Mobility Management Function) 318, SMF (Session Management Function) 320, UP/UPFs (User Plane Function(s)) 322, websites, etc.). While FIG. 3 illustrates an example environment 300, it is understood in the context of this document, that the techniques discussed herein may also be implemented in other networking technologies.

As briefly discussed above, the 5G core network 304 may expose network Functions (NFs) to nodes within the network 304, and/or nodes within some other network, such as the network 302 or 306. As illustrated, the 5G CN exposes AMF 318, SMF 320, and UP/UPFs 322. In some examples, the nodes use a standard Application Programming Interface (API) to communicate. Using the API, a node, such as a node in the network 302 or 306, can communicate with any node in the 5G CN 304.

As briefly discussed above, a UE, such as UE 310 may use user plane nodes that are selected based, at least in part, on a location of the UE 310. For example, a UP/UPF 322 may be selected that is nearest to the UE 310. Choosing the nearest UP/UPF 322 may reduce latency to the UE 310 when sending and receiving packets through a cellular network, such as a 5G network. On the other hand, not choosing the nearest UP/UPF 322 to the UE 310 may add latency when delivering packets to the UE 310. In some examples, the UPF 322 can be selected based on latency and/or location.

In some examples, the UE 310 requests a new session that is received by an AMF 318. The AMF 318 receives the request from the UE 310 and handles connection or mobility management requests while forwarding session management requirements to the SMF 320. The AMF 318 may determine which SMF 320 to use by querying a network Repository Function (NRF). According to some configurations, the SMF 320 may access and/or store data that identifies the connected cell-IDs associated with UEs and the corresponding connected UP/UPFs.

In some examples, the SMF 320 chooses the UP/UPF 322 to use based, at least in part, on the cell-ID sent by the UE and the location of the UE. According to some configurations, the SMF 320 may also use other data to assist in determining what UP/UPF 322 to use. For example, the SMF 320 may use available bandwidth, current usage statistics, forecasted usage statistics, and/or some other data that may indicate capability of the UP/UPF 322 to provide service at a desired level to the UE 310. As a particular example, the SMF 320 may determine that UP/UPF 322(B) is closest to the UE 310, UP/UPF 322(A) is second closest to the UE 310, and UP/UPF 322(N) is farthest from the UE 310. The SMF 320 may also determine that UP/UPF 322(B) has sufficient resources available to handle the session for UE 310. As such, the SMF 320 may select and use the UP/UPF 322(B).

The container controller component 104 can interface with the SMF 320, an NRF, and/or the UPFs 322 to determine which resource is closest to the UE 310 and, in turn, can determine where to instantiate a container and/or where to route requests to an existing container. For example, the container controller component 104 can instantiate a container on a same computing resource as the computing resource hosting a UPF assigned to the UE 310 for a communication session. In some examples, based at least in part on network information determined by the SMF, the container controller component 104 can instruct the container 314 to respond to any requests from the UE instead of the container 122, or vice versa.

Accordingly, FIG. 3 illustrates how aspects of the environment 300 can be leveraged to provide information where to best instantiate containers in a network and/or where to route requests given a plurality of containers capable of responding to requests, as discussed herein.

Figure 4:
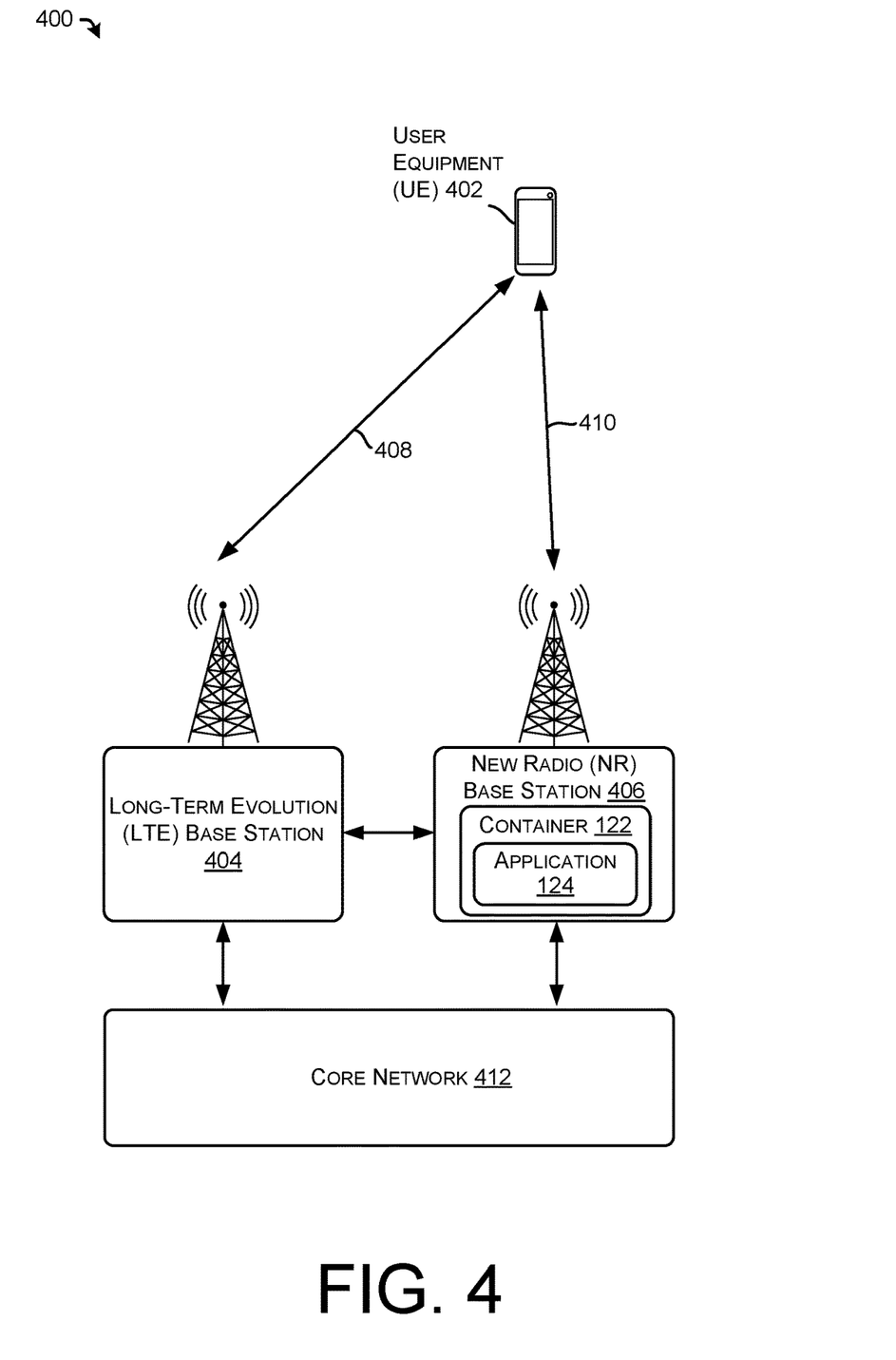
FIG. 4 shows an example network including containerized application(s) in a dual connectivity environment.

FIG. 4 shows an example network 400 including containerized application(s) in a dual connectivity environment. The network can include a UE 402 in communication with a Long-Term Evolution (LTE) base station 404 and a New Radio (NR) base station 406. The UE 402 can communicate with the LTE base station 404 via an LTE connection 408 and the UE 402 can communicate with the NR base station 406 via an NR connection 410. Accordingly, the connections 408 and 410 can represent a dual connectivity connection.

The network 400 can have one or more access networks that include base stations and/or other access points, as well as a core network 412 linked to the access network. Additional details of the core network 412 and access networks are discussed throughout this disclosure.

In some examples, the LTE base station 404 and the NR base station 406 may be located at the same cell site. In other examples, the LTE base station 404 and the NR base station 406 may be located at different cell sites.

One or both of the LTE base station 404 and the NR base station 406 can be connected to the core network 412. For example, one or both of the LTE base station 404 and the NR base station 406 may be connected to the core network 412 via S1 interfaces, or other interfaces, for transmission of user plane data and/or control plane data. The LTE base station 404 and the NR base station 406 may also be connected to each other over an X2 interface, or other interface, for transmission of user plane data and/or control plane data.

As noted above, the UE 402 and the telecommunication network can be configured to support dual connectivity between the UE 402 and multiple base stations in the access network. For example, the UE 402 can establish the LTE connection 408 with the LTE base station 406 and the 5G connection 410 with the NR base station 406. The UE 402 can thus establish an EN-DC connection (e.g., a dual connectivity connection) with the telecommunication network that uses both the LTE connection 408 and the 5G connection 410. However, when the UE 402 does not establish or maintain the EN-DC connection, the UE 402 may instead use the LTE connection 408 alone without the 5G connection 410. In some examples, the UE 402 may use the 5G connection 410 without the LTE connection 408.

An EN-DC connection that uses both the LTE connection 408 and the 5G connection 410 may be based on a 3GPP EN-DC configuration, such as an "option 3x" EN-DC configuration, "option 3" EN-DC configuration, "option 3a" EN-DC configuration, or other EN-DC configuration. In some of these examples, the LTE base station 404 can be a primary node in the EN-DC configuration, while the NR base station 406 can be a secondary node. In other examples, the NR base station 406 can be the primary node and the LTE base station 404 can be the secondary node. The primary node may be configured to exchange control plane data with the core network 412, the UE 402, and with the secondary node. In some examples, the secondary node may not have direct interfaces for exchanging control plane data with the core network 412 and/or the UE 402, but may send and receive control plane data via the primary node. In some examples, both the LTE base station 404 and the NR base station 406 may be configured to directly exchange user plane data with the core network 412. In other examples, one of the LTE base station 404 and the NR base station 406 may instead indirectly exchange user plane data with the core network 412 via the other one of the LTE base station 404 and the NR base station 406.

When the UE 402 connects to the core network 412 via one or both of the LTE base station 404 and the NR base station 406, one or more bearers can be established between the core network 412 and the UE 402. Bearers can be virtual channels used to transport data for the UE 402 between network elements. For example, an E-UTRAN Radio Access Bearer (E-RAB) can be established between a gateway of the core network 412 and the UE 402, with the E-RAB including an S1 bearer between the gateway of the core network 412 and the LTE base station 404, and a data radio bearer between the LTE base station 404 and the UE 402. The LTE connection 408 can thus be associated with the data radio bearer between the LTE base station 404 and the UE 402. The 5G connection 410 can similarly be associated with a data radio bearer between the NR base station 406 and the UE 402.

Multiple bearers can be set up between the network elements for different types of traffic for the UE 402. For example, the telecommunication network can set up a default bearer for general traffic associated with the UE 402, as well as dedicated bearers for traffic associated with specific services. For instance, a dedicated bearer can be set up for voice call data when the UE 402 is engaged in a voice call.

In some examples, a bearer between the core network 412 and the UE 402 can be established as a split bearer that passes through both the LTE base station 404 and the NR base station 406 when an EN-DC connection has been established for the UE 402. For instance, a bearer can exist between the core network 412 and the LTE base station 404, and the bearer can split into two legs at the LTE base station 404. A first leg of the split bearer can be associated with the LTE connection 408 between the LTE base station 404 and the UE 402. A second leg of the split bearer may pass from the LTE base station 404 to the NR base station 406 and then to the UE 402, such that the second leg is associated with the 5G connection 410 between the NR base station 406 and the UE 402. In other examples, the bearer may be established from the core network 412 to the NR base station 406, where the bearer can be split into two legs associated with the LTE connection 408 and the 5G connection 410 such that data is received at the NR base station 406 and a first portion of data is transmitted to the UE 402 via the 5G connection 410 and a second portion of the data is passed to the LTE base station 404 to be transmitted to the UE via the LTE connection 408. In still other examples, a first bearer can be established from the core network 412 to the LTE base station 404 and to the UE 402, while a separate second bearer can be established from the core network 412 to the NR base station 406 and to the UE 402. In these examples, a portion of the first bearer can be associated with the LTE connection 408, while a portion of the second bearer can be associated with the 5G connection 410.

In the examples discussed above, data may be routed through one or both of the LTE connection 408 and/or the NR connection 410. For example, data can be routed based on bearer configuration, data type (e.g., voice, video, data, TCP, UDP, etc.), traffic KPIs (e.g., QCI, QoS, etc.), application type, latency requirement, and the like. In some examples, a container associated with a particular service can be instantiated at a particular base station or at a computing device based on requirements associated with the service.

For example, the network 400 illustrates the container 122 hosting or executing the application 124 being instantiated at the NR base station 406. For example, in an implementation where the NR base station 406 is the primary base station for the EN-DC connection, a first bearer is provided between the core network 412 and the NR base station 406 and is split for a first portion of data to be transmitted to the UE 402 via the LTE connection 408 and a second portion of data to be transmitted to the UE via the NR connection 410. Thus, wherein traffic associated with the application 124 is to be routed through the NR connection 410 (e.g., based on an application type, latency, bandwidth, subscriber data, etc.) locating the container 122 at the NR base station 406 (or at a computing device associated with the NR base station 406) can provide improved performance to the UE 402.

Of course, the container 122 can be instantiated at the LTE base station 404 in addition or instead of at the NR base station 406. In some examples, the container 122 instantiated at the NR base station 406 can provide data to the base station 404 and 406, or a separate container can be instantiated in connection with the LTE base station 404 in the event a communication falls back from the NR base station 406 to the LTE base station 404.

In some examples, signaling within or associated with the core network 412 (e.g., an RRC reconfigure message) can be used to determine a location to instantiate container(s) in a network or at an edge of a network, and/or can be used to determine where to route requests from UEs to an appropriate container.

Figure 5:
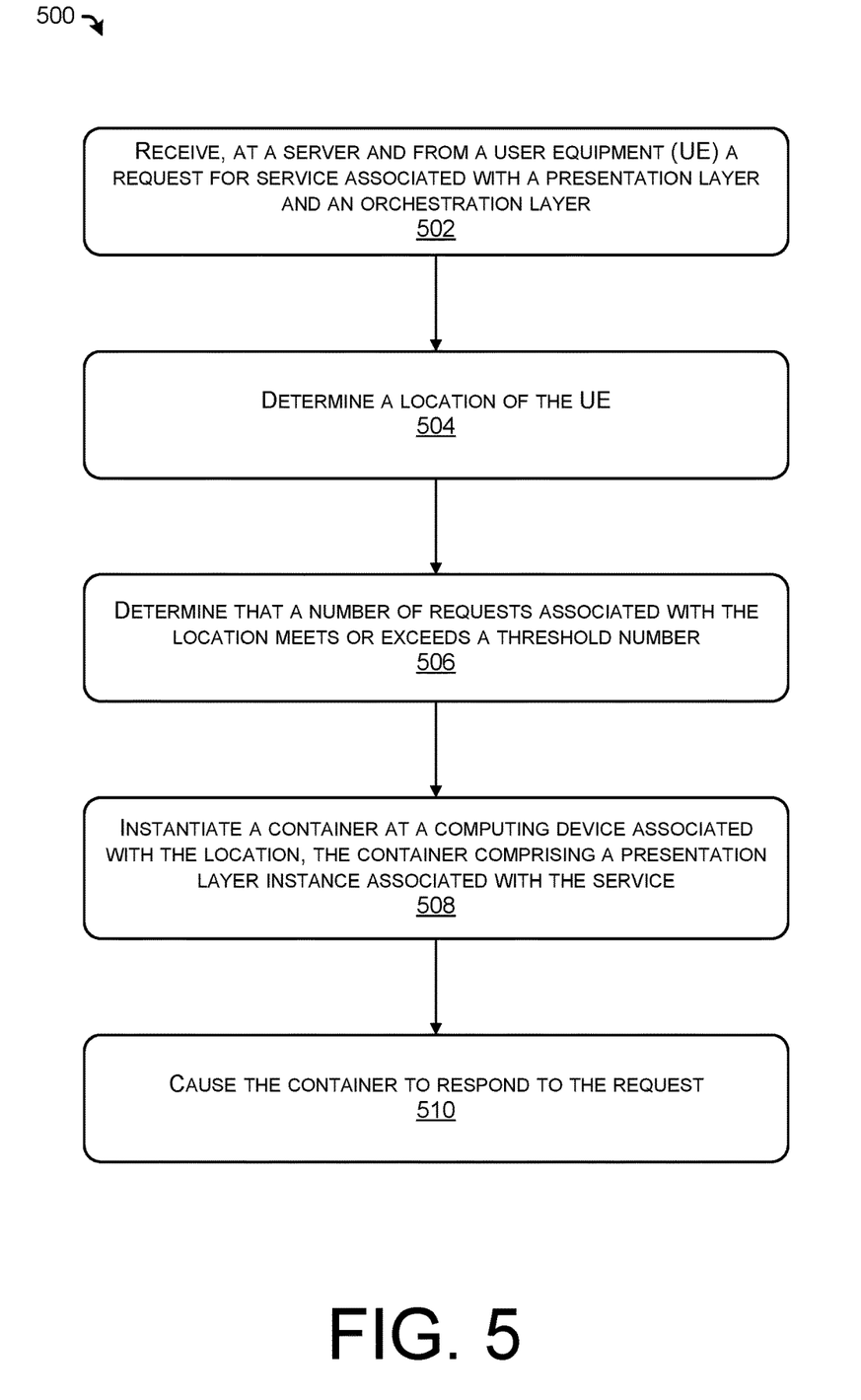
FIG. 5 illustrates an example process for instantiating containerized application(s) based on network requests.

FIG. 5 illustrates an example process and sequence diagram in accordance with examples of the disclosure. This process is illustrated as a logical flow graph, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order, omitted, and/or performed in parallel to implement the process.

FIG. 5 illustrates an example process 500 for instantiating containerized application(s) based on network requests. The example process 500 can be performed by the container controller component 104, and/or by the device 200 comprising the container controller component 104, or another component or device as discussed herein.

At operation 502, the process can include receiving, at a server and from a user equipment (UE) a request for service, wherein the service may be associated with a presentation layer and an orchestration layer. As discussed herein, a least a portion of the service can be associated with a containerized application.

At operation 504, the process can include determining a location of the UE. In some examples, the operation 504 can include determining a physical or logical location (e.g., a network location) of the UE in a network. For example, a location can be determined based on GPS information from the UE, timing advance data, base station triangulation data, base station identifier, a UPF associated with a UE communication session, and the like. In some examples, the operation 504 can include receiving location information from a SMF of a network, or other device associated with a network.

At operation 506, the process can include determining that a number of requests associated with the location meets or exceeds a threshold number. In some examples, the operation 506 can include tracking the number of requests over time, such that a threshold number of requests can be determined with respect to a period time. In some examples, in addition to or instead of determining the number of requests, the operation 506 can include determining one or more metrics associated with request(s) of the service. For example, the metrics can include, but are not limited to, latency, round trip time, bandwidth levels, congestion levels, processing time, processing volumes, and the like. In some examples, a threshold number can be based at least in part on a metric. For example, the threshold number can be inversely proportional to a latency metric, such that as a latency associated with requests from a location increases the threshold number of requests may decrease, thereby instantiating a container at a lower number of requests.

At operation 508, the process can include instantiating a container at a computing device associated with the location, the container comprising a presentation layer instance associated with the service. The operation 508 can be performed in response to determining the number of requests with respect to a threshold number and/or on one or more metrics associated with the requests, as discussed here.

At operation 510, the process can include causing the container to respond to the request. For example, the operation 510 can include updating a DNS server to direct requests associated with a location or region to a particular container in the network.

CONCLUSION

Although features and/or methodological acts are described above, it is to be understood that the appended claims are not necessarily limited to those features or acts. Rather, the features and acts described above are disclosed as example forms of implementing the claims.

What is claimed is:

1. A method comprising:
   receiving, at a server and from a user equipment (UE), a request for a service associated with a presentation layer and an orchestration layer;
   determining a location of the UE;
   determining that a number of requests associated with the location meets or exceeds a threshold number;
   determining a computing device associated with the location;
   instantiating, based at least in part on the number of requests meeting or exceeding the threshold number, a first container at the computing device, the first container comprising a first presentation layer instance associated with the service;
   determining, based on the location, that a metric associated with a second container comprising a second presentation layer instance associated with the service meets or exceeds a threshold metric; and
   causing the first container to respond to the request,
   wherein the instantiating comprises instantiating the first container comprising the first presentation layer instance based at least in part on the metric meeting or exceeding a threshold metric, and the metric comprises one or more of a latency metric, a bandwidth metric, or a congestion metric.

2. The method of claim 1, wherein the server comprises a Domain Name System (DNS) server, the method further comprising:
   updating an Internet Protocol (IP) address associated with the service based at least in part on instantiating the first container.

3. The method of claim 1, further comprising:
   determining that the number of requests associated with the location meets or exceeds the threshold number within a period of time.

4. The method of claim 1, wherein the first container is a Kubernetes container.

5. The method of claim 1, wherein the first presentation layer instance comprises an application associating with presenting a user interface on a display associated with the UE.

6. The method of claim 1, further comprising:
   determining a type of the UE; and
   instantiating the first container based at least in part on the type of the UE.

7. The method of claim 1, further comprising:
   determining the threshold number based at least in part on the service.

8. A system comprising:
   one or more processors; and
   one or more non-transitory computer-readable media storing computer-executable instructions that, when executed, cause the one or more processors to perform operations comprising:
   receiving, at a server and from a user equipment (UE), a request for a service associated with a presentation layer and an orchestration layer;
   determining a network location associated with the UE;
   determining that a number of requests associated with the network location meets or exceeds a threshold number;
   determining a computing device associated with the network location;
   instantiating, based at least in part on the number of requests meeting or exceeding the threshold number, a first container at the computing device, the first container comprising a first presentation layer instance associated with the service;
   determining, based on the network location, that a metric associated with a second container comprising a second presentation layer instance associated with the service meets or exceeds a threshold metric; and
   causing the first container to respond to the request,
   wherein the instantiating comprises instantiating the first container comprising the first presentation layer instance based at least in part on the metric meeting or exceeding a threshold metric, and the metric comprises one or more of a latency metric, a bandwidth metric, or a congestion metric.

9. The system of claim 8, wherein the server comprises a Domain Name System (DNS) server, the operations further comprising:
   updating an Internet Protocol (IP) address associated with the service based at least in part on instantiating the first container.

10. The system of claim 8, wherein the network location comprises a base station, the operations further comprising:
    determining that the number of requests associated with the network location meets or exceeds the threshold number within a period of time.

11. The system of claim 8, wherein the first presentation layer instance comprises an application associating with presenting a user interface on a display associated with the UE.

12. The system of claim 8, the operations further comprising:
   determining the threshold number based at least in part on the service.

13. One or more non-transitory computer-readable media storing computer-executable instructions that, when executed, cause one or more processors to perform operations comprising:
   receiving, at a server and from a user equipment (UE), a request for a service associated with a presentation layer and an orchestration layer;
   determining a network location associated with the UE;
   determining that a number of requests associated with the network location meets or exceeds a threshold number;
   determining a computing device associated with the network location;
   instantiating, based at least in part on the number of requests meeting or exceeding the threshold number, a first container at the computing device, the first container comprising a first presentation layer instance associated with the service;
   determining, based on the network location, that a metric associated with a second container comprising a second presentation layer instance associated with the service meets or exceeds a threshold metric; and
   causing the first container to respond to the request,
   wherein the instantiating comprises instantiating the first container comprising the first presentation layer instance based at least in part on the metric meeting or exceeding a threshold metric, and the metric comprises one or more of a latency metric, a bandwidth metric, or a congestion metric.

14. The one or more non-transitory computer-readable media of claim 13, wherein the server comprises a Domain Name System (DNS) server, the operations further comprising:
   updating an Internet Protocol (IP) address associated with the service based at least in part on instantiating the first container.

15. The one or more non-transitory computer-readable media of claim 13, wherein the network location comprises a base station, the operations further comprising:
   determining that the number of requests associated with the network location meets or exceeds the threshold number within a period of time.

16. The one or more non-transitory computer-readable media of claim 13, the operations further comprising:
   determining the threshold number based at least in part on the service.

\* \* \* \* \*